W. GOLDFARB.
SANITARY SUGAR CONTAINER.
APPLICATION FILED MAR. 11, 1915.
1,154,506.
Patented Sept. 21, 1915.
2 SHEETS—SHEET 1.
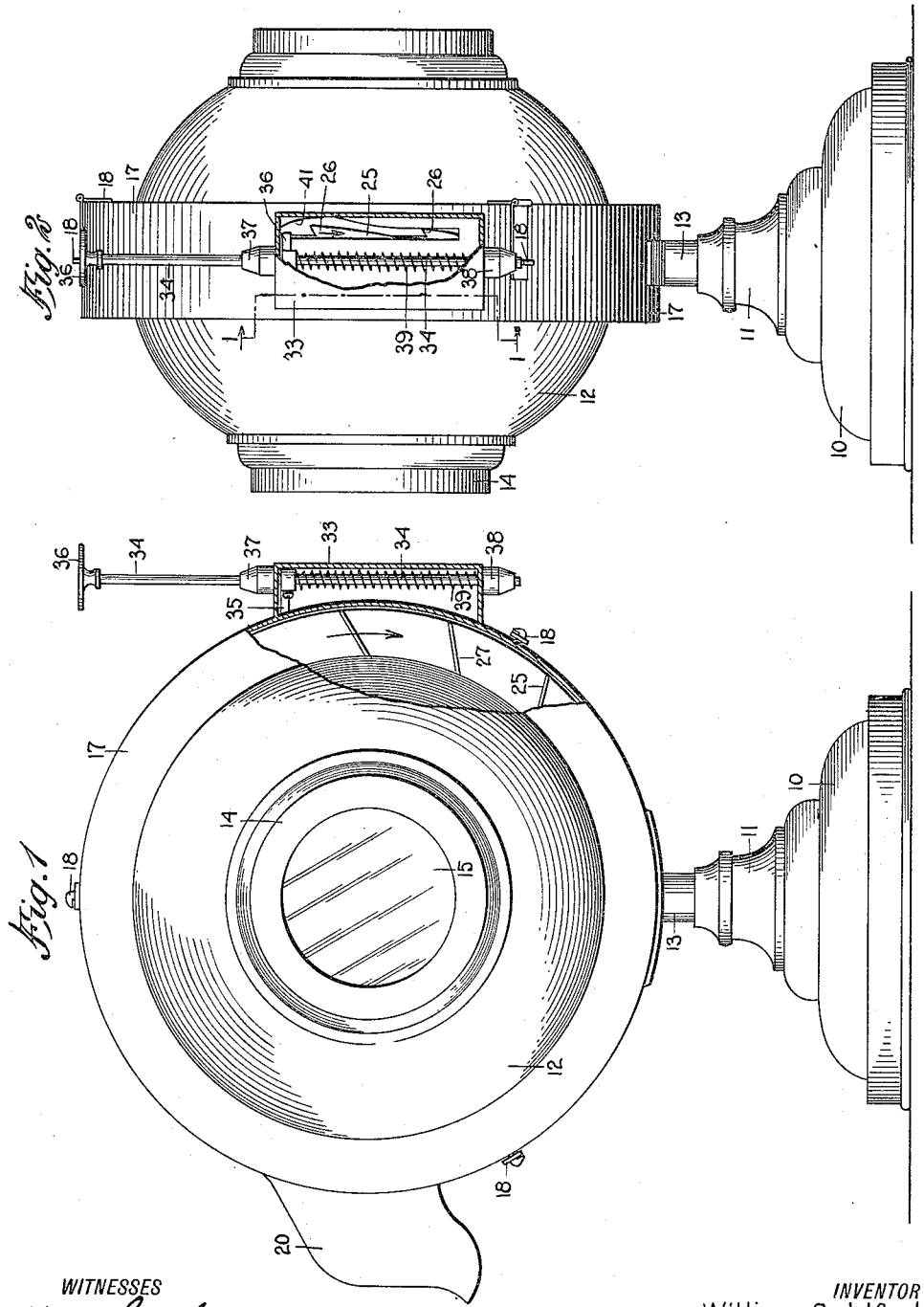
WITNESSES
F. D. Sweet
Geo. L. Beeler
INVENTOR
William Goldfarb
BY Munn & Co
ATTORNEYS W. GOLDFARB.
SANITARY SUGAR CONTAINER.
APPLICATION FILED MAR. 11, 1915.
1,154,506.
Patented Sept. 21, 1915.
2 SHEETS—SHEET 2.
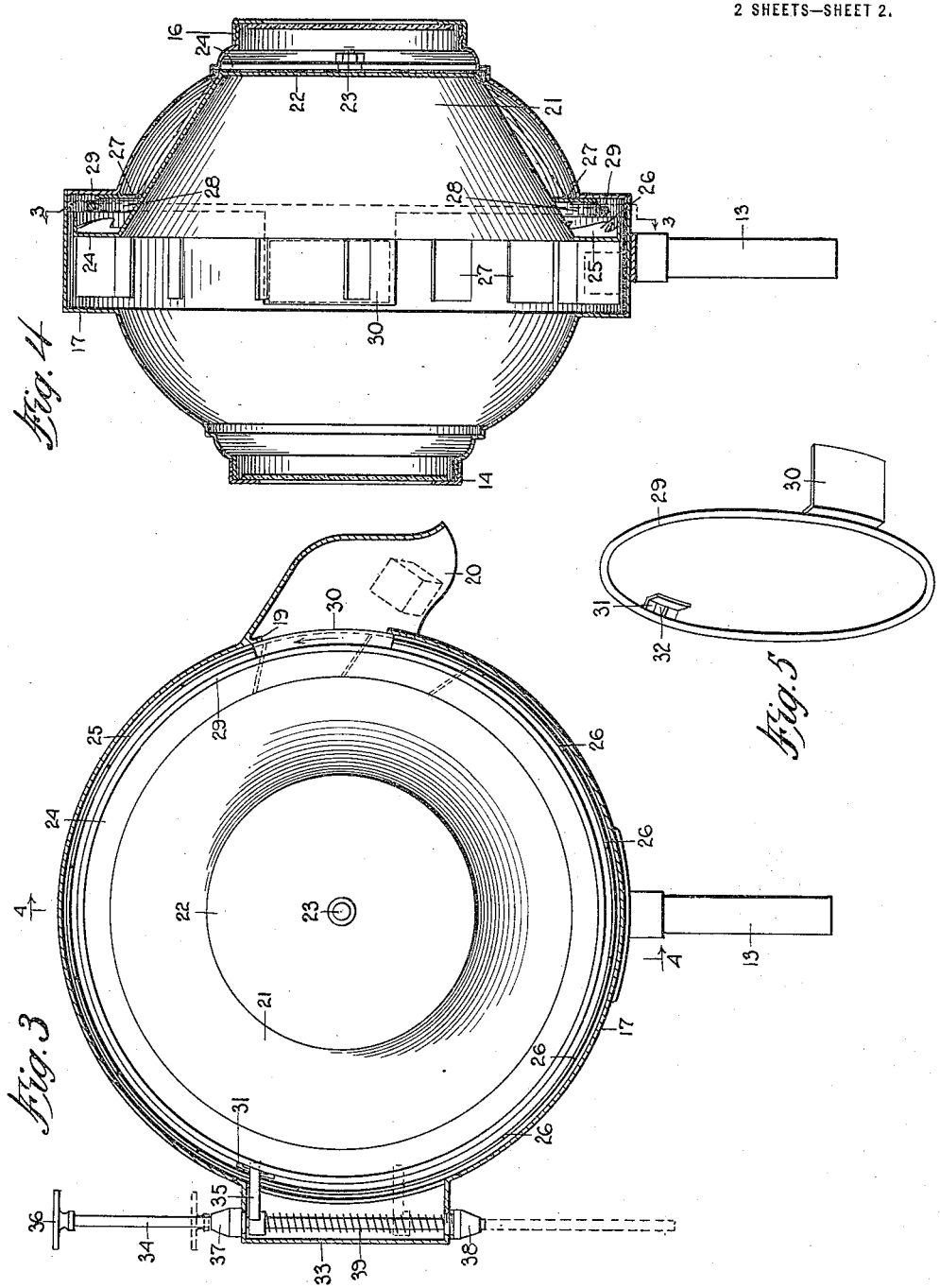
WITNESSES
F. D. Sweet
Geo. L. Beeler
INVENTOR
William Goldfarb
BY
ATTORNEYS

UNITED STATES PATENT OFFICE.

WILLIAM GOLDFARB, OF NEW YORK, N. Y.

SANITARY SUGAR-CONTAINER.

1,154,506.

Specification of Letters Patent.   Patented Sept. 21, 1915.

Application filed March 11, 1915.   Serial No. 13,682.

*To all whom it may concern:*

Be it known that I, WILLIAM GOLDFARB, a subject of the King of Roumania, and a resident of the city of New York, borough of Manhattan, in the county and State of New York, have invented a new and Improved Sanitary Sugar-Container, of which the following is a full, clear, and exact description.

This invention relates to devices for retaining and dispensing commodities and has particular reference to a container for lump sugar and means for dispensing the lumps singly in rapid succession.

Among the objects of the invention is to provide a container of the character indicated which will contain a large quantity of lump sugar in proportion to the size of the apparatus, means being provided to protect the contents of the container and keep the same sanitary, free from contamination from any source.

More definitely stated, the invention comprises a hollow cylinder adapted to be substantially filled with lump sugar and provided with a drum having a circumferential series of blades, means being provided to rotate the drum step-by-step whereby each blade will deliver a single lump of sugar, means being provided also to keep the discharge opening of the casing normally closed to exclude dust, insects or the like.

The foregoing and other objects of the invention will hereinafter be more fully described and claimed and illustrated in the drawings forming a part of this specification in which like characters of reference indicate corresponding parts in all the views, and in which—

Figure 1 is a front elevation of a preferred embodiment of the invention, a part being broken away on the line 1—1 of Fig. 2 to show certain detail features of construction; Fig. 2 is an end elevation looking toward the left in Fig. 1, also with a portion of the actuator casing broken away; Fig. 3 is a vertical section on the line 3—3 of Fig. 4, said line being broken and extending outward to include the outer face of the drum in this figure; Fig. 4 is a vertical transverse section on the line 4—4 of Fig 3; and Fig. 5 is a perspective view of the shutter mechanism.

The several parts of this device may be made of any suitable materials, and the relative sizes and proportions, as well as the general design of the mechanism, may be varied to a considerable extent without departing from the spirit of the invention hereinafter more fully described and claimed.

Referring more particularly to the drawings I show at 10 a base having a pedestal 11, these parts typifying any suitable stand or supporting means for the container.

The container proper comprises a hollow casing 12 made preferably of sheet metal and of any suitable size or capacity. This casing is provided preferably with a radially disposed vertical stem 13 supported in the pedestal 11 and providing for rotation of the casing to accommodate customers on any side of the device.

The casing is provided with a front removable cap 14 arranged, for the sake of convenience and beauty, preferably concentric with respect to the main horizontal axis of the casing. This cap carries a window 15 through which the condition of supply inside of the casing may be observed. The cap 14 may be secured in place by screw threads or their equivalent, and upon removal of the cap and the tilting of the casing rearwardly, the interior available space within the casing may be filled with lumps of sugar. The sugar may lie against the window 15 when the device is in normal upright position, but in all events is protected from promiscuous handling.

The rear portion of the casing for the sake of symmetry is preferably of the same form as the front and is provided with a similar removable cap 16. The two main portions of the casing, front and rear, are connected in a preferably cylindrical channel structure 17, the parts being provided with hasps 18 to hold them together. The channel portion 17 is provided on one side with a discharge opening 19 having a hood 20 extending thereover.

At 21 I show a drum indicated herein as of frusto-conical form whose smaller end is closed as shown at 22 and whose larger end or base end is open and closely parallel to the transverse plane of the casing midway between the caps 14 and 16. The end 22 is provided with a trunnion 23 journaled in a fixed bearing 24 secured in the end of the casing adjacent the cap 16. This trunnion constitutes the main supporting connection between the drum and the casing and allows free rotation of the drum. Extending outwardly from the large open mouth of the drum is a flat flange 24 from the periphery of which extends in one direction another flange 25 carrying a circular series of teeth 26 of the form shown best in Fig. 2, and on the opposite side of the flange 24 are secured a circular series of spaced blades 27. These blades substantially fill the principal part of the space transversely of the channel portion between the flange 24 and the opposite wall of the channel. These blades are preferably of rectangular form and are entirely free from one another and from other parts of the device except where they are connected each at one end to the flange 24, leaving the spaces between the blades unobstructed for the sugar lumps to enter from the interior of the casing and allowing the lumps to drop freely outwardly therefrom when coming opposite the opening 19. The space between adjacent blades is designed to be just large enough for a single lump of sugar to be dispensed.

That wall of the channel surrounding the larger end of the drum is provided with an angle member 27' of circular form and constituting an auxiliary support for the drum. This angle member 27 includes a short cylindrical flange 28 reaching toward the flange 24 and within the radius of the flange 25 thereof. This flange 28 constitutes a support or keeper for a ring 29 which carries on one side a shutter 30 and on the other side a lug 31 having a hole 32 extending radially therethrough. The shutter 30 constitutes a normal closure for the opening 19, the form of the shutter being similar to the inner surface of the cylindrical portion of the channel 17. See Figs. 3 and 4.

The channel portion of the casing is provided opposite the hood 20 with an actuator casing 33 in and through which projects a plunger 34 which, together with a finger 35, constitutes an actuator for the rotary drum and the shutter mechanism. The plunger has a finger piece 36 and by action upon the same the plunger is forced downwardly through or along a guide plug 37 at the top of the casing 33 and a similar guide plug 38 at the bottom thereof. These plugs may be secured in any suitable manner to the casing 33 as by screw threads, but the rod of the plunger 34 is adapted to glide freely therethrough. The finger 35 is secured rigidly to the plunger and is held normally elevated, as shown in Fig. 3, by virtue of a spring 39 surrounding the plunger and bearing at its lower end upon the plug 38. The finger 35 projects inwardly through a slot 40 (see Fig. 2) and is caused to bear against the flange 25 by reason of the cam shaped wall 41 at the upper end of said slot, so that on the next depression of the finger piece the finger 35 will positively engage a tooth 26, causing rotation of the drum through one step.

At the same time the finger 35 extending through the hole 32 of the lug 31 will cause rotation of the ring 29 in the same direction and to the same extent, with the result that the shutter 30 will be elevated so as to allow the lump of sugar brought to discharging position to fall freely out through the opening 19. When the spring 39 acts to restore the plunger to normal position, the finger 35 thereof will return the shutter mechanism likewise to normal position with the shutter closing the opening. The shutter, therefore, not only prevents any possibility of a second lump of sugar being delivered without another operation of the plunger, but will prevent dust or insects from entering the casing through the opening.

I claim:

1. In a sugar container, the combination of a hollow casing having a removable cap for introducing sugar, a frusto-conical drum journaled for rotation within the casing, a series of spaced blades carried by the periphery of said drum, means to rotate the drum step-by-step to an extent equal to the spaces between the blades, said casing having an opening at one side along which the blades pass, and a shutter normally closing said opening and movable away from the same by the operation of the drum rotating means.

2. In a sugar container, the combination with a hollow casing and a drum rotatable therein, said drum carrying a series of spaced blades and the casing having an opening in one side along which said blades pass, of shutter mechanism including a ring surrounding the drum and a shutter carried by the ring and normally closing said opening, and means to give the ring a partial rotation at each forward step-by-step movement of the drum whereby the shutter is removed from in front of the opening.

3. In a sugar container, the combination with a casing comprising front and rear portions connected together forming a channel having a cylindrical wall, said wall having a discharge opening at one side, and a drum journaled within the casing and having a flange extending into the channel and a series of blades connected to the flange and movable therewith along said cylindrical wall in front of the opening, of means to rotate the drum and blades step-by-step causing a single blade to pass the opening at each step, shutter mechanism normally closing the opening, and means to cause the shutter mechanism to clear the opening at each step-by-step movement of the drum.

4. In a sugar container, the combination with a container comprising front and rear portions connected together forming a cylindrical channel portion and a drum journaled for rotation around the axis of the casing, said drum including a series of blades movable in the channel and sweeping along the inner cylindrical surface thereof, said casing furthermore including a discharge opening on one side over which said blades move, of shutter mechanism comprising a ring surrounding the drum, a shutter on one side of the ring and a lug carried by the other side of the ring, said lug having a hole extending radially therethrough, and an actuator serving to cause step-by-step rotation of the drum in a single direction and simultaneous and oscillatory movement of the shutter mechanism.

5. In a sugar container, the combination of a casing having a discharge opening in one side and a vertical slot in the opposite side, a drum journaled for rotation within the casing on an axis transverse to the diameter extending from the opening to the slot, an actuator including a finger extending inwardly through said slot and serving to cause step-by-step rotation of the drum in a single direction, said drum having a series of spaced blades movable in front of said opening in succession, and shutter mechanism including a ring surrounding the drum and a shutter secured to one side of the ring and normally closing said opening and having a lug secured to the other side of the ring through which said finger projects whereby at each reciprocation of the actuator the ring will be given an oscillation around the axis of the drum.

6. In a sugar container, the combination of a casing having a circular channel formed therein, said channel having a discharge opening formed therethrough and also a slot formed remote from the discharge opening, said slot having a cam edge adjacent its upper end, a drum journaled within the casing on an axis concentric with respect to the channel, said drum including a flange carrying on one side a series of teeth movable downwardly along said slot and having on the other side a series of blades movable upwardly along said discharge opening, and an actuator for rotating the drum, said actuator including a plunger, a finger secured to the plunger and extending inwardly therefrom through said slot and caused by said cam to engage one of the teeth whereby upon the downward movement of the actuator the drum will be given a step-by-step rotation, and a spring acting to maintain the actuator finger elevated.

In testimony whereof I have signed my name to this specification in the presence of two subscribing witnesses.

WILLIAM GOLDFARB.

Witnesses:
GEO. L. BEELER,
YAHN SCHER.

Copies of this patent may be obtained for five cents each, by addressing the "Commissioner of Patents, Washington, D. C."